Matteson & Williamson.
Hay Fork.
No. 86565. Patented Feb. 2 1869
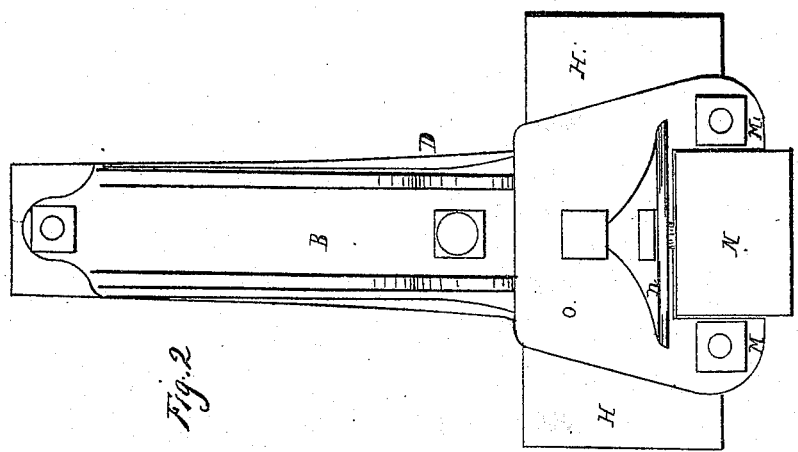
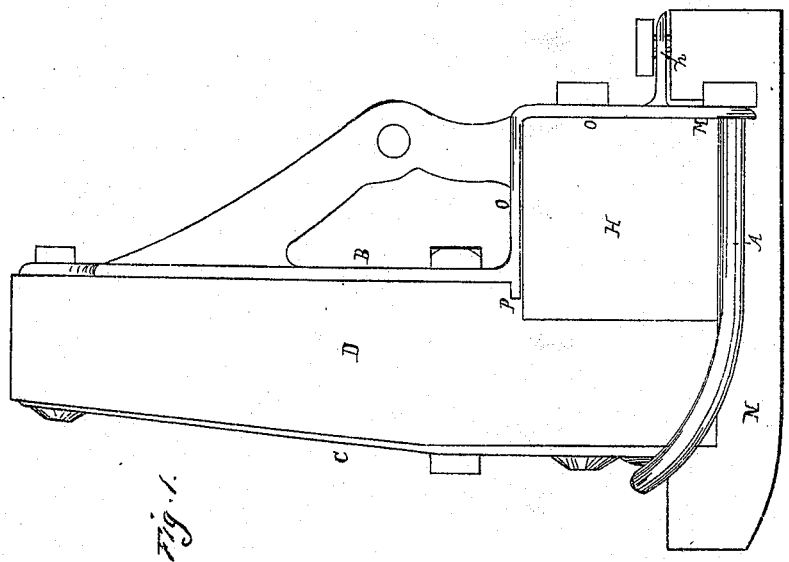
Witnesses.
Geo. H. Strong
J. L. Boone
Inventors.
D. C. Matteson
T. D. Williamson
By their atty.
Dewey & Co.

DON CARLOS MATTESON AND TRUMAN PANE WILLIAMSON, OF STOCKTON, CALIFORNIA.

Letters Patent No. 86,565, dated February 2, 1869.

IMPROVEMENT IN HORSE HAY-FORKS.

The Schedule referred to in these Letters Patent and making part of the same.

*To all whom it may concern:*

Be it known that we, DON CARLOS MATTESON and TRUMAN PANE WILLIAMSON, of Stockton, county of San Joaquin, State of California, have invented an Improved Horse Hay-Fork; and we do hereby declare the following description, and accompanying drawings, are sufficient to enable any person skilled in the art or science to which it most nearly appertains, to make and use our said invention or improvements without further invention or experiment.

The object of our invention is to make such improvements, in a horse hay-fork, as will give it a greater amount of strength at that point where the strain comes in operating it, and consists in binding the head or cross-timber, to which the tines are attached. and the upright post together, without a mortise, by means of iron straps and bands, which closely and firmly hold them.

In a horse hay-fork, the point where all have so far failed to withstand the rough usage they are subjected to, is at this junction of the several parts, on account of the cutting away of the wood necessary to secure them, and give them a proper amount of firmness.

To more fully describe our invention, reference is had to the accompanying drawings, forming part of this specification, in which—

Figure 1 is a side elevation of our improved fork.
Figure 2 is a front view.
Similar letters of reference in each of the figures indicate like parts.

D is the upright post of a horse hay-fork, having its lower end set firmly in the handle or shoe N, and secured to it by iron straps, B and C, one on its front and one on its rear face, which are secured by bolts.

In the angle formed by the junction of the upright post D and shoe N, is placed the cross-timber or head H, which is let into the shoe to the same depth as the upright post D, and also, a short distance in the post D, in which position it is secured by a metal plate, O, bent at right angles, and joined to the strap B, so as to form a continuation of it.

The upright post is cut away at the angle formed by the head H, so as to allow an extension, or spur, P, of the plate O, to enter and form a sort of lock, to hold it more firmly in place.

The plate O is furnished with two side lugs, M M, which extend downward and clasp the handle N, on each side, and a lug, n, projects forward on the top of the handle N, and is bolted firmly to it.

The lugs M M project below the head H, and an iron stirrup, A, passes beneath the head, and over the foot of the post D, and is secured to the lugs, on each side of the handle, by nuts.

By this method of securing the cross-timber H to the upright post and handle, we overcome the weak points in a horse hay-fork, binding all the parts together as though it were one solid piece.

Having thus described our invention,
What we claim, and desire to secure by Letters Patent, is—

1. The plate O, with its lugs M M and n, and the spur P, constructed and arranged substantially as herein described.

2. The stirrup A, passing around the post N, substantially as and for the purpose described.

In witness whereof, we have hereunto set our hands and seals.

DON CARLOS MATTESON. [L. S.]
TRUMAN PANE WILLIAMSON. [L. S.]

Witnesses:
R. W. BRUSH,
O. G. LANGMAID.